(12) United States Patent
Miura et al.

(10) Patent No.: US 6,201,071 B1
(45) Date of Patent: Mar. 13, 2001

(54) POLYETHER COPOLYMER, SOLID POLYMER ELECTROLYTE AND BATTERY

(75) Inventors: Katsuhito Miura; Masanori Yanagida; Kazumasa Hinoue, all of Hyogo; Yoshiro Furukawa, Osaka, all of (JP)

(73) Assignee: Daiso Co., Ltd., Osaka (JP)

( * ) Notice: Subject to any disclaimer, the term of this patent is extended or adjusted under 35 U.S.C. 154(b) by 0 days.

(21) Appl. No.: 09/242,880

(22) PCT Filed: Jun. 24, 1998

(86) PCT No.: PCT/JP98/02802

§ 371 Date: Apr. 19, 1999

§ 102(e) Date: Apr. 19, 1999

(87) PCT Pub. No.: WO98/58983

PCT Pub. Date: Dec. 30, 1998

(30) Foreign Application Priority Data

Jun. 25, 1997 (JP) .................................. 9-168506

(51) Int. Cl.[7] .......................... C08G 63/91; C08G 65/32; H01M 6/18
(52) U.S. Cl. .......................... 525/410; 525/415; 429/311
(58) Field of Search .................................. 525/410, 415, 525/403, 404, 407, 409; 429/192, 311, 312

(56) References Cited

U.S. PATENT DOCUMENTS

| Re. 33,367 | 10/1990 | Mirua et al. | 528/409 |
|---|---|---|---|
| 3,835,097 | * 9/1974 | Fischer et al. | 525/403 |
| 4,711,950 | 12/1987 | Miura et al. | 528/409 |
| 4,818,644 | 4/1989 | Armand | 429/192 |
| 5,047,048 | * 9/1991 | Bezwada et al. | 525/415 |
| 5,116,918 | * 5/1992 | Höcker et al. | 525/415 |
| 5,162,174 | * 11/1992 | Andrei et al. | 429/311 |
| 5,264,547 | * 11/1993 | Yamaguchi et al. | 525/415 |
| 5,578,662 | * 11/1996 | Bennett et al. | 525/409 |
| 5,968,681 | * 10/1999 | Miura et al. | 429/311 |

FOREIGN PATENT DOCUMENTS

| 59-124932 | 7/1984 | (JP) . |
|---|---|---|
| 62-169823 | 7/1987 | (JP) . |
| 62-249361 | 10/1987 | (JP) . |
| 63-154736 | 6/1988 | (JP) . |
| 2-235957 | 9/1990 | (JP) . |
| 5-320324 | 12/1993 | (JP) . |
| 6-223842 | 8/1994 | (JP) . |
| 8-295713 | 11/1996 | (JP) . |

OTHER PUBLICATIONS

Rokicki et al.; "Synthesis of Poly(Hydroxyurethanes) From Diepoxides, Carbon, Dioxide and Diamines"; American Chemical Society; 114:186119; 1989.

Rokicki et al.; "Cyclic Carbonates Obtained by Reactions of Alkali Metal Carbonates with Epihalohydrins"; American Chemical Society; 102:6244; 1984.

* cited by examiner

*Primary Examiner*—Philip Tucker
(74) *Attorney, Agent, or Firm*—Foley & Lardner

(57) ABSTRACT

A solid polymer electrolyte containing a polyether copolymer having a weight-average molecular weight of $10^4$ to $10^7$ which may optionally be cross-linked and which contains (A) 1 to 99% by mol of a repeating unit derived from a monomer represented by the formula (I):

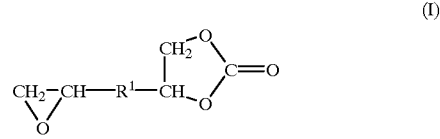

wherein $R^1$ represents a divalent organic group, (B) 99 to 1% by mol of a repeating unit derived from ethylene oxide, and (C) 0 to 15% by mol of a repeating unit derived from a monomer having one epoxy group and at least one reactive functional group, an electrolyte salt compound, and a plasticizer has an excellent ionic conductivity.

18 Claims, No Drawings

POLYETHER COPOLYMER, SOLID POLYMER ELECTROLYTE AND BATTERY

FIELD OF THE INVENTION

The present invention relates to a polyether copolymer, a solid polymer electrolyte and a battery. More particularly, it relates to a solid polymer electrolyte which is suitable as a material for an electrochemical device such as a battery, a capacitor and a sensor.

RELATED ART

As an electrolyte constituting an electrochemical device such as a battery, a capacitor and a sensor, those in the form of a solution or a paste have hitherto been used in view of the ionic conductivity. However, the following problems are pointed out. That is, there is a fear of damage of an apparatus arising due to liquid leakage, and subminiaturization and thinning of the device are limited because a separator to be impregnated with an electrolyte solution is required. To the contrary, a solid electrolyte such as inorganic crystalline substance, inorganic glass and organic polymer substance is suggested. The organic polymer substance is generally superior in processability and moldability and the resulting solid electrolyte has good flexibility and bending processability and, furthermore, the design freedom of the device to be applied is high and, therefore, the development is expected. However, the organic polymer substance is inferior in ionic conductivity to other materials at present.

Extensive researches have been carried out on solid polymer electrolytes since the finding of ionic conductivity in a system of ethylene oxide homopolymer and alkali metal ions. As a result, polyethers such as polyethylene oxide are now considered to be most promising as polymer matrices in view of their high mobilities and solubilities of metal cations. It has been predicted that migration of ions occurs in amorphous regions rather than crystalline regions of such polymers. Since then, copolymerization of polyethylene oxide with various epoxides has been carried out in order to decrease the crystallinity of polyethylene oxide. Japanese Patent Kokoku Publication No. 249361/1987 discloses solid electrolytes comprising copolymers of ethylene oxide and propylene oxide, and U.S. Pat. No. 4,818,644 discloses solid electrolytes comprising copolymers of ethylene oxide and methyl glycidyl ether. Their ionic conductivities were not, however, entirely satisfactory in either case.

Although Japanese Patent Kokai Publication No. 235957/1990 filed by the present applicant proposes an attempt in which particular alkali metal salts are contained in mixtures of epichlorohydrin-ethylene oxide copolymers and low molecular weight polyethylene glycol derivatives to be used as solid polymer electrolytes, a practically adequate value of conductivity could not been achieved.

Furthermore, Japanese Patent Kokai Publication Nos. 223842/1994 and 295713/1996 describe solid electrolytes comprising copolymers having carbonate groups on the side chains. The backbone of these copolymers, however, does not have a polyether structure, but has a polyolefin structure which has a poor mobility and a low conductivity.

SUMMARY OF THE INVENTION

An object of the present invention provides a solid electrolyte which is superior mechanical properties and ionic conductivity.

The present invention provides a polyether copolymer having a weight-average molecular weight of $10^4$ to $10^7$ which may optionally be cross-linked and which comprises:

(A) 1 to 99% by mol of a repeating unit derived from a monomer represented by the formula (I):

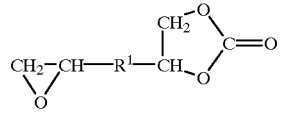

(I)

wherein $R^1$ represents a divalent organic group, (B) 99 to 1% by mol of a repeating unit derived from a monomer represented by the formula (II):

(II)

and (C) 0 to 15% by mol of a repeating unit derived from a monomer having one epoxy group and at least one reactive functional group.

The present invention also provides a solid polymer electrolyte comprising:

(1) the above polyether copolymer, (2) an electrolyte salt compound, and (3) if necessary, a plasticizer selected from the group consisting of an aprotic organic solvent, and a derivative or metal salt of a linear or branched polyalkylene glycol having a number-average molecular weight of 200 to 5,000 or a metal salt of said derivative.

The present invention further provides a battery comprising the above solid polymer electrolyte.

A crosslinked material of the polyether copolymer is used when the shape stability at high temperature is required.

When the plasticizer is blended with the solid polymer electrolyte, the crystallization of the polymer is inhibited and the glass transition temperature is lowered and a large amount of an amorphous phase is formed even at low temperature and, therefore, the ionic conductivity is improved. It has been also found that, when the solid polymer electrolyte of the present invention is used, a high-performance battery having small internal resistance can be obtained. The solid polymer electrolyte of the present invention may be in the form of a gel. The term "gel" used herein means a polymer swollen with a solvent.

DETAILED DESCRIPTION OF THE INVENTION

The repeating unit (C) may be derived from a monomer of the formula (III):

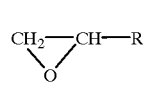

(III)

wherein $R^2$ represents a reactive functional group-containing group.

The polyether polymer of the present invention comprises (A) a repeating unit derived from a monomer (I):

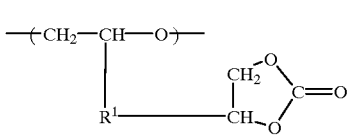
(I')

wherein $R^1$ is a divalent group, and (B) a repeating unit derived from a monomer (II):

(II')

In the polyether copolymer of the present invention, the divalent group of $R^1$ group in the formula (I) is preferably
—$CH_2$—O—($CHA^1$—$CHA^2$—O)$_n$—$CH_2$—,
—$CH_2$—O—($CH_2$)$_n$—,
—$CH_2$—O—(O)C—($CH_2$)$_n$—,
—($CH_2$)$_m$—$CO_2$—($CH_2$)$_n$—, or
—($CH_2$)$_m$—O—$CO_2$—($CH_2$)$_n$—
wherein each of $A^1$ and $A^2$ is hydrogen or a methyl group,
n is the number of 0 to 12,
and m is the number of 0 to 6.
More preferably, the $R^1$ group is
—$CH_2$—O—($CHA^1$—$CHA^2$—O)$_n$—$CH_2$—,
—$CH_2$—O—($CH_2$)$_n$—, or
—$CH_2$—O—(O)C—($CH_2$)$_n$—
wherein each of $A^1$ and $A^2$ is hydrogen or a methyl group,
and n is the number of 0 to 6.

The polyether copolymer optionally comprises (C) a repeating unit derived from a monomer having one epoxy group and at least one reactive functional group. A crosslinked material can be derived from the polyether copolymer having the repeating unit (C) by utilizing the reactivity of the reactive functional group.

The copolymer used in the present invention may be crosslinked or not crosslinked. Examples of a crosslinking agent for crosslinking a binary copolymer having the repeating unit (I') and the repeating unit (II') specifically include isocyanate compounds such as 2,4-tolylene diisocyanate, 2,6-tolylene diisocyanate, 4,4-diphenylmethane diisocyanate and hexamethylene diisocyanate.

The repeating unit (C) derived from a monomer of the formula (III) is represented by the formula (III'):

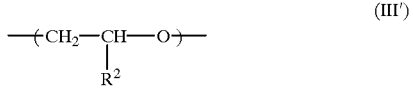
(III')

wherein $R^2$ represent a reactive functional group-containing group.

The reactive functional group in the repeating unit (C) is preferably (a) a reactive silicon group, (b) an epoxy group, (c) an ethylenically unsaturated group, or (d) a halogen atom.

The polymerization method of the polyether copolymer, which may have a crosslinkable side chain, of the present invention is the polymerization method wherein a copolymer is obtained by a ring opening reaction of ethylene oxide portion and can be conducted in the same manner as that described in Japanese Patent Kokai Publication Nos. 154736/1988 and 169823/1987 filed by the present applicant.

The polymerization reaction can be conducted as follows. That is, the polyether copolymer can be obtained by reacting the respective monomers at the reaction temperature of 10 to 80° C. under stirring, using a catalyst mainly containing an organoaluminum, a catalyst mainly containing an organozinc, an organotin-phosphate ester condensate catalyst and the like as a ring opening polymerization catalyst in the presence or absence of a solvent. Among of them, the organotin-phosphate ester condensate catalyst is particularly preferable in view of the polymerization degree, or properties of the resulting copolymer and the like. In the polymerization reaction, the reactive functional group does not react so that a copolymer having the reaction functional group is obtained. When an oxirane compound having epoxy groups at only the both ends is used, an only epoxy group containing no substituent such as no methyl group is used for polymerization and an epoxy group containing a methyl group remains in the polymer without any reaction.

In the polyether copolymer of the present invention, the content of the repeating unit (A) is from 1 to 99% by mol, e.g. from 3 to 99% by mol, particularly from 10 to 95% by mol, and especially from 10 to 80% by mol; the content of the repeating unit (B) is from 99 to 1% by mol, e.g. from 95 to 1% by mol, particularly from 90 to 5% by mol, and specifically from 80 to 5% by mol; and the content of the repeating unit (C) is from 0 to 15% by mol, e.g. 0 to 10% by mol, preferably from 0 to 5% by mol, and particularly 0.001 to 5% by mol. When the content of the repeating unit (B) exceeds 99% by mol, an increase in glass transition temperature and crystallization of the oxyethylene chain arise, which results in drastic deterioration of the ionic conductivity of the solid electrolyte. It is generally known that the ionic conductivity is improved by the decrease of the crystallizability of polyethylene oxide. It has been found that, in case of the polyether copolymer of the present invention, the effect for improvement of the ionic conductivity is remarkably large.

With respect to the molecular weight of the polyether copolymer, the weight-average molecular weight is suitable within the range from $10^4$ to $10^7$, and preferably from $10^4$ to $5 \times 10^6$, so as to give excellent processability, moldability, mechanical strength and flexibility. More preferably it is from $5 \times 10^4$ to $5 \times 10^6$, particularly from $10^5$ to $5 \times 10^6$.

In the present invention, a glass transition temperature of the polyether copolymer is preferably not more than −40° C., and a fusion heat of the polyether copolymer is preferably not more than 90 J/g. If the glass transition temperature and the fusion heat exceed the above values, a decrease of ionic conductivity may arise. The glass transition temperature and the fusion heat of the polyether copolymer are measured by a differential scanning calorimeter (DSC).

The polyether copolymer of the present invention may be any copolymer type such as a block copolymer and a random copolymer, but the random copolymer is preferable because the effect for reduction of the crystallizability of polyethylene oxide is large. The polyether copolymer of the present invention is a polyether copolymer having a side chain containing two oligooxyethylene groups and, if necessary, a side chain containing a crosslinkable reactive functional group. The polyether copolymer of the present invention is a copolymer formed from at least two monomers.

The monomer having a reactive silicon group, which constitutes the repeating unit (C), is preferably represented by the formula (III-a):

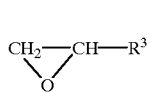
(III-a)

wherein $R^3$ is a reactive silicon-containing group.

The reactive silicon group-containing monomer represented by the formula (III-a) is preferably a compound represented by the formula (III-a-1) or (III-a-2).

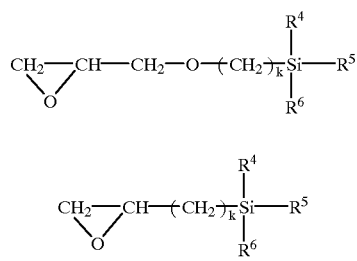

(III-a-1)

(III-a-2)

In the formulas (III-a-1) and (III-a-2), $R^4$, $R^5$ and $R^6$ may be the same or different, but at least one of them represents an alkoxy group and the remainder represent an alkyl group; and k represents 1 to 6.

Examples of the monomer represented by the formula (III-a-1) include 2-glycidoxyethyltrimethoxysilane, 3-glycidoxypropylmethyldimethoxysilane, 3-glycidoxypropyltrimethoxysilane and 4-glycidoxybutylmethyltrimethoxysilane.

Examples of the monomer represented by the formula (III-a-2) include 3-(1,2-epoxy)propyltrimethoxysilane, 4-(1,2-epoxy)butyltrimethoxysilane and 5-(1,2-epoxy) pentyltrimethoxysilane.

1-(3,4-epoxycyclohexyl)methylmethyldimethoxysilane and 2-(3,4-epoxycyclohexyl)ethyltrimethoxysilane can be used in addition to the monomers (III-a-1) and (III-a-2).

Among them, 3-glycidoxypropyltrimethoxysilane, 3-glycidoxypropylmethyldimethoxysilane and 4-(1,2-epoxy)butyltrimethoxysilane are particularly preferable.

The monomer having two epoxy groups, which constitutes the repeating unit (C), is preferably represented by the formula (III-b):

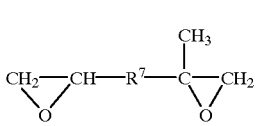

(III-b)

wherein $R^7$ is a divalent organic group. The monomer having two epoxy groups preferably has epoxy groups at the both ends. $R^7$ is preferably an organic group comprising elements selected from hydrogen, carbon and oxygen.

It is preferable that the group $R^7$ in the formula (III-b) is
—$CH_2$—O—($CHA^1$—$CHA^2$—O$)_m$—$CH_2$—,
—$(CH_2)_m$—, or
—$CH_2O$—Ph—$OCH_2$—
wherein $A^1$ and $A^2$ represent hydrogen or a methyl group; Ph represents a phenylene group; and m represents a numeral of 0 to 12.

The monomer having two epoxy groups is preferably a compound represented by the following formula (III-b-1), (III-b-2) or (III-b-3):

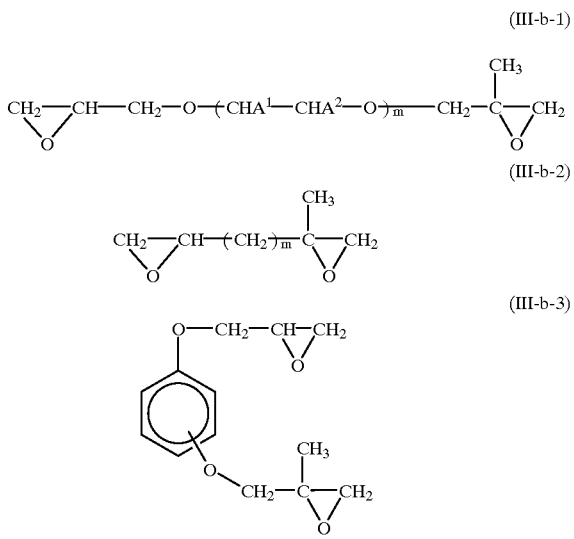

(III-b-1)

(III-b-2)

(III-b-3)

In the above formulas (III-b-1), (III-b-2) and (III-b-3), $A^1$ and $A^2$ represent a hydrogen atom or a methyl group; and m represents a numeral of 0 to 12.

Examples of the monomer represented by the formula (III-b-1) include 2,3-epoxypropyl- 2',3'-epoxy-2'-methyl propyl ether, ethylene glycol-2,3-epoxypropyl-2',3'-epoxy-2'-methyl propyl ether, and diethylene glycol-2,3-epoxypropyl-2',3'-epoxy-2'-methyl propyl ether.

Examples of the monomer represented by the formula (III-b-2) include 2-methyl-1,2,3,4-diepoxybutane, 2-methyl-1,2,4,5-diepoxypenatane, and 2-methyl-1,2,5,6-diepoxyhexane.

Examples of the monomer represented by the formula (III-b-3) include hydroquinone-2,3-epoxypropyl-2',3'-epoxy-2'-methyl propyl ether, and catechol-2,3-epoxypropyl-2',3'-epoxy-2'-methyl propyl ether.

Among them, 2,3-epoxypropyl-2',3'-epoxy-2'-methyl propyl ether and ethylene glycol-2,3-epoxypropyl-2',3'-epoxy-2'-methyl propyl ether are particularly preferable.

The monomer having the ethylenically unsaturated group, which constitutes the repeating unit (C), is preferably represented by the formula (III-c):

(III-c)

wherein $R^8$ is a group having an ethylenically unsaturated group.

As the ethylenically unsaturated group-containing monomer, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate and glycidyl-4-hexenoate. Allyl glycidyl ether, glycidyl acrylate and glycidyl methacrylate are preferable.

The monomer (C) having a halogen atom is preferably represented by the formula (III-d):

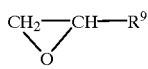
(III-d)

wherein $R^9$ is a group having at least one halogen atom. $R^9$ may be, e.g. an alkyl group substituted with a halogen atom, for example, a $C_{1-6}$ alkyl group.

Examples of the monomer having a halogen atom include:

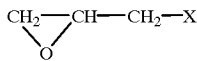

wherein X is a halogen atom, particularly a bromine atom (Br) or a iodine atom (I). Examples of the monomer having a halogen atom include epibromohydrin and epiiodohydrin.

As the crosslinking method of the copolymer wherein the reactive functional group is a reactive silicon group, the crosslinking can be conducted by the reaction between the reactive silicon group and water. In order to increase the reactivity, there may be used, as a catalyst, organometal compounds, for example, tin compounds such as dibutyltin dilaurate and dibutyltin maleate; titanium compounds such as tetrabutyl titanate and tetrapropyl titanate; aluminum compounds such as aluminum trisacetyl acetonate and aluminum trisethyl acetoacetate; or amine compounds such as butylamine and octylamine.

As the crosslinking method of the copolymer wherein the reactive functional group is an epoxy group, polyamines, acid anhydrides and the like can be used.

Examples of the polyamines include aliphatic polyamines such as diethylenetriamine and dipropylenetriamine; and aromatic polyamines such as 4,4'-diaminodiphenyl ether, diaminodiphenyl sulfone, m-phenylenediamine and xylylenediamine. The amount of the polyamine varies depending on the type of the polyamine, but is normally within the range from 0.1 to 10% by weight based on the whole composition excluding a plasticizer (that is, a composition excluding a plasticizer from a solid electrolyte).

Examples of the acid anhydrides includes maleic anhydride, phthalic anhydride, methylhexahydrophthalic anhydride, tetramethylenemaleic anhydride and tetrahydrophthalic anhydride. The amount of the acid anhydrides varies depending on the type of the acid anhydride, but is normally within the range from 0.1 to 10% by weight based on the whole composition excluding a plasticizer. In the crosslinking, an accelerator can be used. In the crosslinking reaction of polyamines, the accelerator include phenol, cresol and resorcin. In the crosslinking reaction of the acid anhydride, the accelerator include benzyldimethylamine, 2-(dimethylaminoethyl)phenol and dimethylaniline. The amount of the accelerator varies depending on the type of the accelerator, but is normally within the range from 0.1 to 10% by weight based on the crosslinking agent.

In the crosslinking method of the copolymer wherein the reactive functional group is an ethylenically unsaturated group, a radical initiator selected from an organic peroxide and an azo compound, or active energy ray such as ultraviolet ray and electron ray can be used. It is also possible to use a crosslinking agent having a silicon hydride.

As the organic peroxide, there can be used those which are normally used in the crosslinking, such as a ketone peroxide, a peroxy ketal, a hydroperoxide, a dialkyl peroxide, a diacyl peroxide and a peroxy ester. Specific examples of the organic peroxide include 1,1-bis(t-butylperoxy)-3,3,5-trimethylcyclohexane, di-t-butyl peroxide, t-butylcumyl peroxide, dicumyl peroxide, 2,5-dimethyl-2,5-di(t-butylperoxy)hexane and benzoylperoxide. The amount of the organic peroxide varies depending on the type of the organic peroxide, but it is normally within the range from 0.1 to 10% by weight based on the whole composition excluding a plasticizer.

As the azo compound, there can be used those which are normally used in the crosslinking, such as an azonitrile compound, an azoamide compound and an azoamidine compound. Specific examples of the azo compound include 2,2'-azobisisobutyronitrile, 2,2'-azobis(2-methylbutyronitrile), 2,2'-azobis(4-methoxy-2,4-dimethylvaleronitrile), 2,2-azobis(2-methyl-N-phenylpropionamidine)dihydrochloride, 2,2'-azobis[2-(2-imidazolin-2-yl)propane], 2,2'-azobis[2-methyl-N-(2-hydroxyethyl)propionamide], 2,2'-azobis(2-methylpropane) and 2,2'-azobis[2-(hydroxymethyl)propionitrile]. The amount of the azo compound varies depending on the type of the azo compound, but is normally within the range from 0.1 to 10% by weight based on the whole composition excluding a plasticizer.

In the crosslinking due to radiation of activated energy ray such as ultraviolet ray, glycidyl acrylate ester, glycidyl methacrylate ester and glycidyl cinnamate ester are particularly preferable among the monomer component represented by the formula (III-c). Furthermore, as the auxiliary sensitizer, there can be optionally used acetophenones such as diethoxyacetophenone, 2-hydroxy-2-methyl-1-phenylpropan-1-one and phenylketone; benzoin ethers such as benzoin and benzoin methyl ether; benzophenones such as benzophenone and 4-phenylbenzophenone; thioxanthones such as 2-isopropylthioxanthone and 2,4-dimethylthioxanthone; azides such as 3-sulfonylazidobenzoic acid and 4-sulfonylazidobenzoic acid.

As a crosslinking aid, there can be optionally used ethylene glycol diacrylate, ethylene glycol dimethacrylate, oligoethylene glycol diacrylate, oligoethylene glycol dimethacrylate, allyl methacrylate, allyl acrylate, diallyl maleate, triallyl isocyanurate, maleimide, phenylmaleimide and maleic anhydride.

As the compound having a silicon hydride group, which is used for crosslinking the ethylenically unsaturated group, a compound having at least two silicon hydride groups can be used. Particularly, a polysiloxane compound or a polysilane compound is preferable.

Examples of the polysiloxane compound include a linear polysiloxane compound represented by the formula (a-1) or (a-2), or a cyclic polysiloxane compound represented by the formula (a-3).

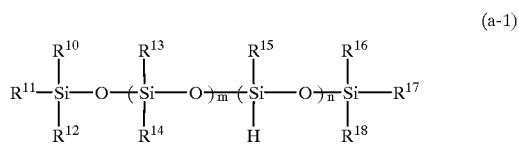
(a-1)

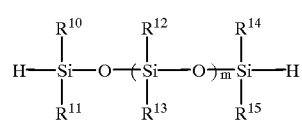
(a-2)

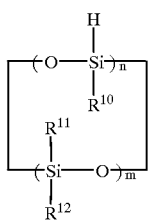

(a-3)

In the formulas (a-1) to (a-3), $R^{10}$, $R^{11}$, $R^{12}$, $R^{13}$, $R^{14}$, $R^{15}$, $R^{16}$, $R^{17}$ and $R^{18}$ respectively represent a hydrogen atom or an alkyl or alkoxy group having 1 to 12 carbon atoms; and $n \geq 2$, $m \geq 0$, $2 \leq m+n \leq 300$. As the alkyl group, a lower alkyl group such as a methyl group and an ethyl group is preferable. As the alkoxy group, a lower alkoxy group such as a methoxy group and an ethoxy group is preferable.

As the polysilane compound, a linear polysilane compound represented by the formula (b-1) can be used.

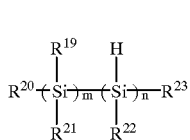

(b-1)

In the formula (b-1), $R^{19}$, $R^{20}$, $R^{21}$, $R^{22}$ and $R^{23}$ respectively represent a hydrogen atom or an alkyl or alkoxy group having 1 to 12 carbon atoms; and $n \geq 2$, $m \geq 0$, $2 \leq m+n \leq 100$.

Examples of the catalyst of the hydrosilylation reaction include transition metals such as palladium and platinum or a compound or complex thereof. Furthermore, peroxide, amine and phosphine can also be used. The most popular catalyst includes dichlorobis(acetonitrile)palladium(II), chlorotris(triphenyl-phosphine)rhodium(I) and chloroplatinic acid.

In the crosslinking method of the copolymer containing a halogen atom (e.g. a bromine atom or a iodine atom), for example, a crosslinking agent such as polyamines, mercaptoimidazolines, mercaptopyrimidines, thioureas and polymercaptanes can be used. Examples of the polyamines include triethylenetetramine and hexamethylenediamine. Examples of the mercaptoimidazolines include 2-mercaptoimidazoline and 4-methyl-2-mercaptoimidazoline. Examples of the mercaptopyrimidines include 2-mercaptopyrimidine, 4,6-dimethyl-2-mercaptopyrimidine. Examples of the thioureas include ethylene thiourea and dibutyl thiourea. Examples of the polymercaptanes include 2-dibutylamino-4,6-dimethylcapto-s-triazine, 2-phenylamino-4,6-dimercaptotriazine. The amount of the crosslinking agent varies depending on the type of the crosslinking agent, but is normally within the range from 0.1 to 30% by weight based on the whole composition excluding a plasticizer.

Furthermore, it is effective to add a metal compound as an acid acceptor to the solid polymer electrolyte in view of the thermal stability of the halogen-containing polymer. Examples of the metal oxide as the acid acceptor include oxide, hydroxide, carbonate salt, carboxylate salt, silicate salt, borate salt and phosphite salt of Group II metal of the periodic table; and oxide, basic carbonate salt, basic carboxylate salt, basic phosphite salt, basic sulfite salt and tribasic sulfate salt of Group VIa metal of the periodic table. Specific examples thereof include magnesia, magnesium hydroxide, magnesium carbonate, calcium silicate, calcium stearate, read lead and tin stearate. The amount of the metal compound as the above acid acceptor varies depending on the type thereof, but is normally within the range from 0.1 to 30% by weight based on the whole composition excluding a plasticizer.

The electrolyte salt compound used in the present invention is preferably soluble in a mixture comprising a polyether copolymer or a crosslinked material of the copolymer and a plasticizer. In the present invention, the following salt compounds are preferably used.

That is, examples thereof include a compound composed of a cation selected from a metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$ and $[(X^1SO_2)(X^2SO_2)YC]^-$, wherein $X^1$, $X^2$, $X^3$ and Y respectively represent an electron attractive group. Preferably, $X^1$, $X^2$ and $X^3$ independently represent a perfluoroalkyl having 1 to 6 carbon atoms or a perfluoroaryl group and Y represents a nitro group, a nitroso group, a carbonyl group, a carboxyl group or a cyano group. $X^1$, $X^2$ and $X^3$ may be the same or different. As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

In the present invention, the amount of the electrolyte salt compound is so that a numeral value of a molar ratio of the number of moles of the electrolyte salt compound to the total number of moles of oxyethylene units (the total number of moles of oxyethylene units included in a main chain and side chain of the polyether copolymer) is preferably within the range from 0.0001 to 5, more preferably from 0.001 to 0.5. When this value exceeds 5, the processability and moldability, the mechanical strength and flexibility of the resulting solid electrolyte may be deteriorated and the ionic conductivity may decrease.

The plasticizer is an aprotic organic solvent, or a derivative or a metal salt of a linear or branched polyalkylene glycol having a number-average molecular weight of 200 to 5,000, or a metal salt of the derivative.

As the aprotic organic solvent, aprotic ethers and esters are preferable. Specific examples include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxyazolidone, tetrahydrofuran, 2-methyltetrahydrofuran, 1,3-dioxolane, 4,4-methyl-1,3-dioxolane, tert-butyl ether, iso-butylether, 1,2-ethoxymethoxyethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ethylene diglyme, methyl tetraglyme, methyl triglyme, methyl diglyme, methyl formate, methyl acetate and methyl propionate and a mixture of two or more of them may be used. Particularly, propylene carbonate, γ-butyrolactone, butylene carbonate and 3-methyl-2-oxyazoline are preferable. Triethylene glycol dimethyl ether, triethylene glycol diethyl ether, tetraethylene glycol dimethyl ether and tetraethylene glycol diethyl ether are also particularly preferable organic solvents.

The derivative or metal salt of the linear or branched polyalkylene glycol or the metal salt of the derivative can be obtained from a polyalkylene glycol having a number-average molecular weight of 200 to 5,000. Examples of the polyalkylene glycol include polyethylene glycol or polypropylene glycol, and examples of the derivative thereof include an ester derivative or ether derivative having an alkyl group having 1 to 8 carbon atoms and an alkenyl group having 3 to 8 carbon atoms.

Among the derivatives, examples of the ether derivative include diethers such as dimethyl ether, diethyl ether, dipropyl ether and diallyl ether, and examples of the ester derivative include diesters such as polyalkylene glycol dimethacrylate ester (e.g. polyethylene glycol dimethacrylate ester), polyalkylene glycol diacetate ester (e.g. polyethylene glycol diacetate ester), and polyalkylene glycol diacrylate ester (e.g. polyethylene glycol diacrylate ester).

Examples of the metal salt include a sodium, lithium and dialkyl aluminum salt of polyalkylene glycol.

Examples of the metal salt of the derivative include sodium, lithium and dialkylaluminum salts (e.g. dioctylaluminum salt) of monoethers such as monomethyl ether, monoethyl ether, monopropyl ether, monobutyl ether, monohexyl ether, mono-2-ethyl-hexyl ether and monoallyl ether; and monoesters such as monoacetate ester, monoacrylate ester and monomethacrylate ester. Examples of the metal salt of polyalkylene glycol derivative include dioctylaluminum salt of polyethylene glycol monomethyl ether, dioctylaluminum salt of polyethylene glycol monoethyl ether and dioctylaluminum salt of polyethylene glycol monoallyl ether.

The number-average molecular weight of the polyalkylene glycol used is more preferably within the range from 200 to 2,000.

The formulating proportion of the plasticizer is optionally selected, but is from 0 to 2,000 parts by weight, preferably 1 to 2,000 parts by weight, e.g. 10 to 1,000 parts by weight, particularly from 10 to 500 parts by weight, based on 100 parts by weight of the polyether copolymer.

When the flame retardancy is required in using the solid polymer electrolyte, a flame retardant can be used. That is, an effective amount of those selected from a halide (such as a brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate as a flame retardant can be added.

The method for production of the solid polymer electrolyte of the present invention is not specifically limited, but the respective components may be mechanically mixed, normally. In case of the multicomponent-copolymer requiring the crosslinking, it is produced by a method such as mechanically mixing the respective components, followed by crosslinking. Alternatively, after crosslinking, the crosslinked copolymer may be impregnated by immersing in a plasticizer for a long time. As means for mechanically mixing, various kneaders, open rolls, extruders and the like can be optionally used.

In case that the reactive functional group is a reactive silicon group, the amount of water used in the crosslinking reaction is not specifically limited because the crosslinking reaction easily occurs even in the presence of moisture in the atmosphere. The crosslinking can also be conducted by passing through a cold water or hot water bath for a short time, or exposing to a steam atmosphere.

In case of the copolymer wherein the reactive functional group is an epoxy group-containing group, when using a polyamine or an acid anhydride, the crosslinking reaction is completed at the temperature of 10 to 200° C. within 10 minutes to 20 hours.

In case of the copolymer wherein the reactive functional group is an ethylenically unsaturated group, when using a radical initiator, the crosslinking reaction is completed at the temperature of 10 to 200° C. within 1 minutes to 20 hours. Furthermore, when using energy ray such as ultraviolet ray, a sensitizer is normally used. The crosslinking reaction is normally completed at the temperature of 10 to 150° C. within 0.1 seconds to 1 hour. In case of the crosslinking agent having a silicon hydride, the crosslinking reaction is completed at the temperature of 10 to 180° C. within 10 minutes to 10 hours.

The method of mixing the electrolyte salt compound and plasticizer with the polyether copolymer is not specifically limited, but examples thereof include a method of impregnating by immersing the polyether copolymer in an organic solvent containing the electrolyte salt compound and plasticizer for a long time, a method of mechanically mixing the electrolyte salt compound and plasticizer with the polyether copolymer, a method of dissolving the polyether copolymer and the electrolyte salt compound in the plasticizer, followed by mixing or a method of dissolving the polyether copolymer once in the other organic solvent, followed by mixing the plasticizer. When producing by using the organic solvent, various polar solvents such as tetrahydrofuran, acetone acetonitrile, dimethylformamide, dimethyl sulfoxide, dioxane, methyl ethyl ketone and methyl isobutyl ketone, may be used alone or in combination thereof.

The solid polymer electrolyte shown in the present invention is superior in mechanical strength and flexibility, and a large area thin-film shaped solid electrolyte can be easily obtained by utilizing the properties. For example, it is possible to make a battery comprising the solid polymer electrolyte of the present invention. In this case, examples of the positive electrode material include lithium-manganese double oxide, lithium cobaltate, vanadium pentaoxide, polyacetylene, polyacene, polypyrene, polyaniline, polyphenylene, polyphenylene sulfide, polyphenylene oxide, polypyrrole, polyfuran and polyazulene. Examples of the negative electrode material include an interlaminar compound prepared by occlusion of lithium between graphite or carbon layers, a lithium metal and a lithium-lead alloy. By utilizing the high ion conductivity, the solid polymer electrolyte can also be used as a diaphragm of an ion electrode of the cation such as alkaline metal ion, Cu ion, Ca ion and Mg ion. The solid polymer electrolyte of the present invention is especially suitable as a material for electrochemical device (e.g. a battery, a capacitor and a sensor).

PREFERRED EMBODIMENTS OF THE INVENTION

The following Examples further illustrate the present invention in detail.

In the following Examples, a monomer (glycidyl ether compound) of the formula (1) is as follows:

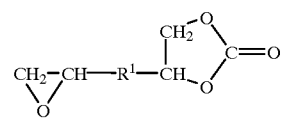

(1)

The monomer used in this example was synthesized in two steps.

SYNTHESIS EXAMPLE 1

Synthesis of Monomer

Step 1

Into a 500 ml reaction vessel equipped with a Dean-Stark trap, a Dimroth condenser and a magnetic stirrer bar, 133 g (1 mol) of 1-allylglycerin, 300 ml of dimethyl carbonate, and 3 g (0.075 mol) of sodium hydroxide pellet were charged. The mixture was heated to 60° C., stirred for 30 minutes, and the temperature was then raised to 90° C. to remove a mixture of dimethyl carbonate and the methanol out of the reaction system until any distillate has been no longer distilled. The reaction mixture was cooled, and tetrahydrofuran was added thereto. After filtering off the precipitate, the filtrate was concentrated under reduced pressure to give 150.3 g (95% yield) of 4-allyloxymethyl-1,3-dioxolan-2-one.

Step 2

Into a 1 L reaction vessel, 78.3 g (0.5 mol) of 4-allyloxymethyl-1,3-dioxolan-2-one obtained in Step 1 and 500 ml of dichloromethane were charged and cooled to 0° C. Into this mixture, 183 g (0.75 mol) of m-chloroperbenzoic acid was added in small portions. After completing the addition, the reaction temperature was raised to room temperature and the reaction mixture was stirred overnight. After completion of the reaction, the salt was filtered off, and the filtrate was cooled to 0° C. and stirred for 30 minutes while adding 300 ml of a 10% aqueous solution of sodium thiosulfate in small portions. After separating an aqueous layer, an organic layer was washed with a saturated aqueous solution of sodium hydrogen carbonate, dried over anhydrous magnesium sulfate, filtered, and concentrated under reduced pressure. The crude product was subjected to a silica-gel chromatography and then distilled to give 51.7 g (60% yield) of propylene carbonate glycidyl ether, bp. 154/0.4 mmHg.

The structure of the product obtained was confirmed by $^1$H NMR. Conditions for $^1$H NMR measurement: solvent, $C_6D_6$; internal standard, TMS; measurement temperature, 30° C. Results of $^1$H NMR measurement: the peaks corresponding to the following structure were observed. δ: 1.9–2.1 (2H, m, a), δ: 2.6 (1H, m, b), δ: 3.5 (1H, m, c), δ: 2.7–3.8 (6H, m, d).

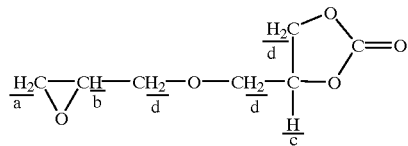

SYNTHESIS EXAMPLE 2

Preparation of Catalyst

Into a 3-necked flask equipped with a stirrer, a thermometer and a distillation apparatus, 10 g of tributyltin chloride and 35 g of tributyl phosphate were charged and heated at 250° C. for 20 minutes with stirring under nitrogen stream while evaporating the distillate to give a solid condensate as a residue. Hereinafter, the organotin/phosphoric acid ester condensate was used as a catalyst for polymerization.

The composition of the polyether copolymer in terms of monomers was determined on the basis of the $^1$H NMR spectrum. For determination of molecular weight of the polyether copolymer, a gel permeation chromatography measurement was conducted and the molecular weight was calculated in terms of standard polystyrenes. The gel permeation chromatography measurement was performed at 60° C. using a measuring apparatus RID-6A (Shimadzu Co.), Shodex KD-807, KD-806, KD-806M and KD-803 columns (Showa Denko K.K.), and DMF as a solvent. A glass transition temperature and a heat of fusion were determined using a differential scanning calorimeter DSC 8230B (Rigaku Denki K.K.) under nitrogen atmosphere over a temperature range from –100 to 80° C. at a rate of temperature rise of 10° C./min. Determination of electric conductivity δ was made on a film which had been vacuum-dried at 20° C. under 1 mmHg for 72 hours by clamping it between platinum electrodes and applying an alternating current (voltage, 0.5 V; frequency range, 5 Hz to 1 MHz) in order to calculate the electric conductivity according to a complex impedance method.

EXAMPLE 1

The inside of a four-necked glass flask having an internal volume of 3 L was substituted with nitrogen, and 2 g of the organotin/phosphoric acid ester condensate obtained in Synthesis Example 2 (example of catalyst preparation), 75 g of propylene carbonate glycidyl ether having a water content adjusted to 10 ppm or below, and 1,000 g of n-hexane as a solvent were charged. While monitoring the rate of polymerization of propylene carbonate glycidyl ether by means of a gas chromatography, 175 g of ethylene oxide was added gradually. The polymerization reaction was terminated with methanol. After recovering the polymer by decantation, it was dried at 40° C. under normal pressure for 24 hours, and further at 45° C. under reduced pressure for 10 hours to give 350 g of the polymer. This copolymer had a glass transition temperature of –45° C., a weight-average molecular weight of 1,100,000, and a heat of fusion of 41 J/g. The composition of this polymer in terms of monomers was 90% by mol of ethylene oxide and 10% by mol of propylene carbonate glycidyl ether as determined by its $^1$H NMR spectrum.

EXAMPLE 2

One gram of the copolymer obtained in Example 1 was dissolved in 20 ml of tetrahydrofuran, and a solution of lithium perchlorate in tetrahydrofuran was mixed therewith so as to give a molar ratio (the number of moles of the electrolyte salt compound/the total number of moles of ether oxygen atom in the polyether copolymer) of 0.08. This mixture liquid was cast on a mold made of polytetrafluoroethylene, and dried thoroughly to give a film. The electric conductivity δ of the film was determined by the alternating current method described above. The electric conductivity of the solid electrolyte was $1.5 \times 10^{-4}$ S/cm at 40° C.

EXAMPLE 3

One gram of the copolymer obtained in Example 1 was dissolved in 20 ml of acetonitrile, and a solution of lithium bistrifluoromethane sufonylimide (hereinafter referred to as LiTFSI) in acetonitrile was mixed therewith so as to give a molar ratio (the number of moles of LiTFSI/the total number of moles of ether oxygen atom in the polyether copolymer) of 0.05. This mixture was cast on a mold made of polytetrafluoroethylene, and dried thoroughly to give a film. The properties of this film were determined as described in Example 2. The electric conductivity of the solid electrolyte was $5.2 \times 10^{-4}$ S/cm at 40° C.

EXAMPLE 4

A secondary cell was constructed using the solid polymer electrolyte obtained in Example 2 as the electrolyte, a lithium metal foil as the anode and lithium cobaltate (LiCoO$_2$) as the cathode. The size of the solid polymer electrolyte was 10 mm×10 mm×0.2 mm. The size of the lithium foil was 10 mm×10 mm×0.1 mm. Lithium cobaltate was prepared by mixing predetermined amounts of powdery lithium carbonate and cobalt carbonate and calcinating the mixture at 900° C. for 5 hours, which was then crushed. To 85 parts by weight of lithium cobaltate thus obtained, 12 parts by weight of acetylene black and 3 parts by weight of the solid polymer electrolyte obtained in Example 2 were added, mixed by rolls, and then press molded by applying a pressure of 300 kgW/cm$^2$ to give a cathode of the cell having a size of 10 mm×10 mm×2 mm.

The solid polymer electrolyte obtained in Example 2 was sandwiched between the lithium metal foil and the lithium cobaltate plate, and the charge-discharge characteristics of the cell were studied at 25° C. while applying a pressure of 10 kgW/cm$^2$ so as to tightly join the interfaces. The discharging current was 0.1 mA/cm$^2$ at the initial terminal voltage of 3.8V, and the cell could be charged at 0.1 mA/cm$^2$. Since the cell of this Example can be easily manufactured in a thin shape, such cells are lightweight and have a high capacity.

EXAMPLE 5

The inside of a four-necked glass flask having an internal volume of 3 L was substituted with nitrogen, and 2 g of the organotin/phosphoric acid ester condensate obtained in Synthesis Example 2 (the example of catalyst preparation), 125 g of propylene carbonate glycidyl ether having a water content adjusted to 10 ppm or below, 8 g of allyl glycidyl ether and 1,000 g of n-hexane as a solvent were charged. While monitoring the rate of polymerization of propylene carbonate glycidyl ether by means of a gas chromatography, 125 g of ethylene oxide was added gradually. The polymerization reaction was terminated with methanol. After recovering the polymer by decantation, it was dried at 40° C. under normal pressure for 24 hours, and further at 45° C. under reduced pressure for 10 hours to give 235 g of the terpolymer. This polymer had a glass transition temperature of −41° C., a weight-average molecular weight of 850,000 according to the gel permeation chromatography, and a heat of fusion of 25 J/g. The composition of this polymer in terms of monomers was 81% by mol of ethylene oxide, 17% by mol of propylene carbonate glycidyl ether, and 2% by mol of allyl glycidyl ether as determined by its $^1$H NMR spectrum.

EXAMPLE 6

One gram of the terpolymer obtained in Example 5 and 0.015 g of a crosslinking agent, dicumyl peroxide, were dissolved in 20 ml of acetonitrile, and 5 ml of a solution of LiTFSI in tetrahydrofuran was mixed therewith so as to give a molar ratio, (the number of moles of the soluble electrolyte salt compound)/(the total number of moles of ether oxygen atom in the polyether copolymer), of 0.05. This mixture was cast on a mold made of polytetrafluoroethylene, dried, then heated and compressed at 160° C. under 20 kg/cm$^2$ for 10 minutes to give a cross-linked film. The properties of the cross-linked film were measured as described in Example 2. The electric conductivity of the solid electrolyte was 3.6×10$^{-4}$ S/cm at 40° C.

EXAMPLE 7

A secondary cell was constructed using the solid polymer electrolyte obtained in Example 6 as the electrolyte, lithium metal foil as the anode and lithium cobaltate (LiCoO$_2$) as the cathode. The size of the solid polymer electrolyte was 10 mm×10 mm×0.2 mm. The size of the lithium foil was 10 mm×10 mm×0.1 mm. Lithium cobaltate was prepared by mixing predetermined amounts of powdery lithium carbonate and cobalt carbonate and calcinating the mixture at 900° C. for 5 hours, which was then crushed. To 85 parts by weight of lithium cobaltate thus obtained, 12 parts by weight of acetylene black and 3 parts by weight of the solid polymer electrolyte obtained in Example 6 which had been free from solvents and had not yet been cross-linked were added, mixed using rolls, and then press molded by applying a pressure of 300 kgW/cm$^2$ to give a cathode of the cell having a size of 10 mm×10 mm×2 mm.

The solid polymer electrolyte obtained in Example 6 which had been free from solvents and had not yet been cross-linked was sandwiched between the lithium metal foil and the lithium cobaltate plate, and the charge-discharge characteristics of the cell were studied at 25° C. while applying a pressure of 10 kgW/cm$^2$ so as to tightly join the interfaces. The discharging current was 0.1 mA/cm$^2$ at the initial terminal voltage of 3.8V, and the cell could be charged at 0.1 mA/cm$^2$. Since the cell of this Example can be easily manufactured in a thin shape, such cells are lightweight and have a high capacity.

EXAMPLE 8

One gram of the terpolymer obtained in Example 5 and 0.015 g of a crosslinking agent, dicumyl peroxide, were mixed with 0.5 ml of a solution of LiTFSI in propylene carbonate so as to give a molar ratio, (the number of moles of the soluble electrolyte salt compound)/(the total number of moles of ether oxygen atom in the polyether copolymer), of 0.05. This mixture was cast on a mold made of polytetrafluoroethylene, then heated and compressed at 160° C. under 20 kgW/cm$^2$ for 10 minutes to give a gel-type cross-linked film. The properties of the gel-type cross-linked film were measured as described in Example 2. The electric conductivity of the solid electrolyte was 1.1×10$^{-3}$ S/cm at 40° C.

EXAMPLE 9

One gram of the terpolymer obtained in Example 5 and 0.015 g of a crosslinking agent, dicumyl peroxide, were mixed with 0.5 ml of a solution of LiTFSI in tetraethylene glycol dimethyl ether so as to give a molar ratio, (the number of moles of the soluble electrolyte salt compound)/(the total number of moles of ether oxygen atom in the polyether copolymer), of 0.05. This mixture liquid was cast on a mold made of polytetrafluoroethylene, then heated and compressed at 160° C. under 20 kgW/cm$^2$ for 10 minutes to give a gel-type cross-linked film. The properties of the gel-type cross-linked film were measured as described in Example 2. The electric conductivity of the solid electrolyte was 9.8×10$^{-4}$ S/cm at 40° C.

EXAMPLE 10

A secondary cell was constructed using the gel-type solid polymer electrolyte obtained in Example 8 as the electrolyte, lithium metal foil as the anode and lithium cobaltate (LiCoO$_2$) as the cathode. The size of the solid polymer electrolyte was 10 mm×10 mm×0.2 mm. The size of the lithium foil was 10 mm×10 mm×0.1 mm. Lithium cobaltate was prepared by mixing predetermined amounts of powdery lithium carbonate and cobalt carbonate and calcinating the mixture at 900° C. for 5 hours, which was then crushed. To 85 parts by weight of lithium cobaltate thus obtained, 12 parts by weight of acetylene black and 3 parts by weight of the solid polymer electrolyte obtained in Example 6 which had been free from solvents and had not yet been cross-linked were added, mixed using rolls, and then press molded by applying a pressure of 300 kgW/cm² to give a cathode of the cell having a size of 10 mm×10 mm×2 mm.

The solid polymer electrolyte obtained in Example 8 was sandwiched between the lithium metal foil and the lithium cobaltate plate, and the charge-discharge characteristics of the cell were studied at 25° C. while applying a pressure of 10 kgW/cm² so as to tightly join the interfaces. The discharging current was 0.1 mA/cm² at the initial terminal voltage of 3.8V, and the cell could be charged at 0.1 mA/cm². Since the cell of this Example can be easily manufactured in a thin shape, such cells are lightweight and have a high capacity.

EXAMPLE 11

A secondary cell was constructed using the gel-type solid polymer electrolyte obtained in Example 9 as the electrolyte, lithium metal foil as the anode and lithium cobaltate (LiCoO₂) as the cathode. The size of the solid polymer electrolyte was 10 mm×10 mm×0.2 mm. The size of the lithium foil was 10 mm×10 mm×0.1 mm. Lithium cobaltate was prepared by mixing predetermined amounts of powdery lithium carbonate and cobalt carbonate and calcinating the mixture at 900° C. for 5 hours, which was then crushed. To 85 parts by weight of lithium cobaltate thus obtained, 12 parts by weight of acetylene black and 3 parts by weight of the solid polymer electrolyte obtained in Example 6 which had been free from solvents and had not yet been cross-linked were added, mixed by rolls, and then press molded by applying a pressure of 300 kgW/cm² to give a cathode of the cell having a size of 10 mm×10 mm×2 mm.

The solid polymer electrolyte obtained in Example 9 was sandwiched between the lithium metal foil and the lithium cobaltate plate, and the charge-discharge characteristics of the cell were studied at 25° C. while applying a pressure of 10 kgW/cm² so as to tightly join the interfaces. The discharging current was 0.1 mA/cm² at the initial terminal voltage of 3.8V, and the cell could be charged at 0.1 mA/cm². Since the cell of this Example can be easily manufactured in a thin shape, such cells are lightweight and have a high capacity.

EFFECTS OF THE INVENTION

The solid polymer electrolytes of the present invention are excellent in their processability, formability, mechanical strength, flexibility, heat resistance and other properties, and have remarkably improved ionic conductivities. They have various applications such as for an electronic apparatus, for example, solid batteries (particularly secondary batteries), high capacitance capacitors, display devices, e.g. an electrochromic display, as well as applications as antistatic agents for rubber or plastic materials or as electrically controlling materials.

What is claimed is:

1. A polyether copolymer having a weight-average molecular weight of $10^4$ to $10^7$ which may optionally be cross-linked and which comprises:

(A) 1 to 99% by mol of a repeating unit derived from a monomer represented by the formula (I):

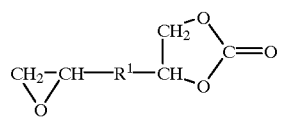

(I)

wherein $R^1$ represents a divalent organic group selected from the group consisting of
—CH₂—O—(CHA¹—CHA²—O)ₙ—CH₂—,
—CH₂—O—(CH₂)ₙ—,
—CH₂—O—(O)C—(CH₂)ₙ—,
—(CH₂)ₘ—CO₂—(CH₂)ₙ—, and
—(CH₂)ₘ—O—CO₂—(CH₂)ₙ—,
wherein A¹ and A² each is hydrogen or a methyl group, n is a number of from 0 to 12 and m is a number of from 0 to 6, (B) 99 to 1% by mol of a repeating unit derived from a monomer represented by the formula (II):

(II)

and (C) 0 to 15% by mol of a repeating unit derived from a monomer having one epoxy group and at least one reactive functional group.

2. The polyether copolymer of claim 1, wherein the group $R^1$ in the formula (I) is

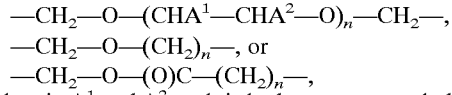

wherein A¹ and A² each is hydrogen or a methyl group, and n is a number of from 0 to 6.

3. The polyether copolymer of claim 1, wherein the reactive functional group in the repeating unit (C) is (a) a reactive silicon group, (b) an epoxy group, (c) an ethylenically unsaturated group, or (d) a halogen atom.

4. The polyether copolymer of claim 3, wherein the monomer having a reactive silicon group which constitutes the repeating unit (C) is 3-glycidoxypropyltrimethoxysilane, 3-glycidoxypropylmethyldimethoxysilane, 4-(1,2-epoxy)butyltrimethoxysilane, or 2-(3,4-epoxycyclohexyl)ethyltrimethoxysilane.

5. The polyether copolymer of claim 3, wherein the monomer having two epoxy groups which constitutes the repeating unit (C) is 2,3-epoxypropyl-2',3'-epoxy-2'-methylpropyl ether or ethylene glycol-2,3-epoxypropyl-2',3'-epoxy-2'-methylpropyl ether.

6. The polyether copolymer of claim 3, wherein the monomer having an ethylenically unsaturated group which constitutes the repeating unit (C) is allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate or glycidyl-4-hexenoate.

7. The polyether copolymer of claim 3, wherein the monomer having a halogen atom which constitutes the repeating unit (C) is epibromohydrin or epiiodohydrin.

8. The polyether copolymer of claim 1, which comprises 10–95% by mol of the repeating unit (A), 90–5% by mol of the repeating unit (B), and 0–10% by mol of the repeating unit (C).

9. A solid polymer electrolyte which comprises:

(1) a polyether copolymer of claim 1, (2) an electrolyte salt compound, and, (3) optionally present, a plasticizer selected from aprotic organic solvents and esters, ethers or metal salts of linear or branched polyalkylene glycols having number-average molecular weights of 200 to 5,000 or metal salts of said esters or ethers.

10. The solid polymer electrolyte of claim 9, wherein the electrolyte salt compound (2) comprises a cation selected from metal cations, ammonium ion, amidinium ion, and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesulfonate ion, dodecylnaphthalenesulfonate ion, 7,7,8,8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$, and $[(X^1SO_2)(X^2SO_2)YC]^-$, wherein $X^1$, $X^2$, $X^3$ and Y each is an electron-attractive group.

11. The solid polymer electrolyte of claim 9, wherein $X^1$, $X^2$ and $X^3$ each is independently a perfluoroalkyl group having 1–6 carbon atoms or a perfluoroaryl group having 6–18 carbon atoms, and Y is a nitro, nitroso, carbonyl, carboxyl, or cyano group.

12. The solid polymer electrolyte of claim 9, wherein the metal cation is the cation of a metal selected from Li, Na, K, Rb, Cs, Mg, Ca, Ba, Mn, Fe, Co, Ni, Cu, Zn, and Ag.

13. The solid polymer electrolyte of claim 9, wherein the aprotic organic solvent is an aprotic organic solvent selected from ethers or esters.

14. The solid polymer electrolyte of claim 9, wherein the aprotic organic solvent is an organic solvent selected from propylene carbonate, γ-butyrolactone, butylene carbonate, 3-methyl-2-oxazolidone, triethylene glycol dimethyl ether, triethylene glycol diethyl ether, tetraethylene glycol dimethyl ether, and tetraethylene glycol diethyl ether.

15. The solid polymer electrolyte of claim 9, wherein the polyalkylene glycol is polyethylene glycol or polypropylene glycol.

16. The solid polymer electrolyte of claim 9, wherein the derivative of polyalkylene glycol is an ether derivative or an ester derivative.

17. The solid polymer electrolyte of claim 9, wherein the metal salt of polyalkylene glycol is any one of a sodium salt, a lithium salt, and a dialkylaluminum salt.

18. A battery comprising a solid polymer electrolyte of claim 9, a cathode and an anode.

* * * * *